(No Model.)
C. W. HUNT.
DRIVE CHAIN.
No. 500,332. Patented June 27, 1893.
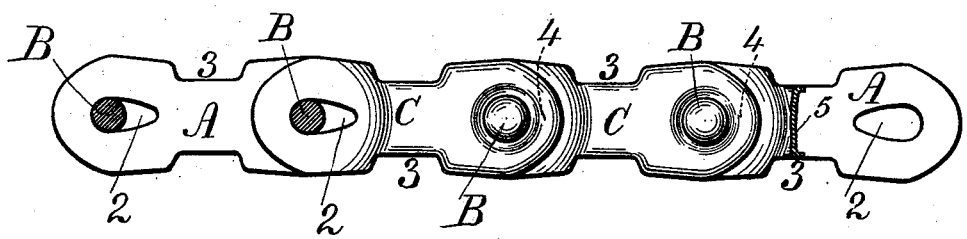
Fig. 1.
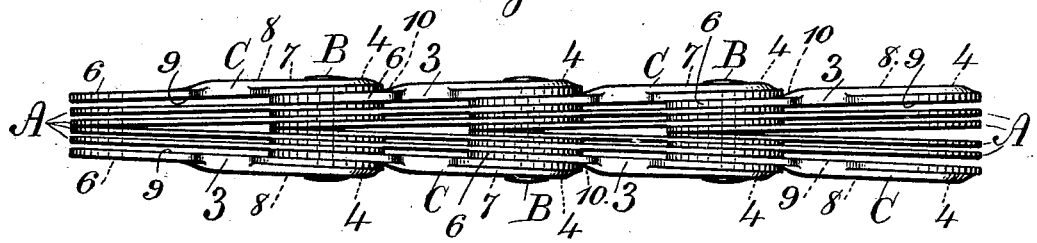
Fig. 2.
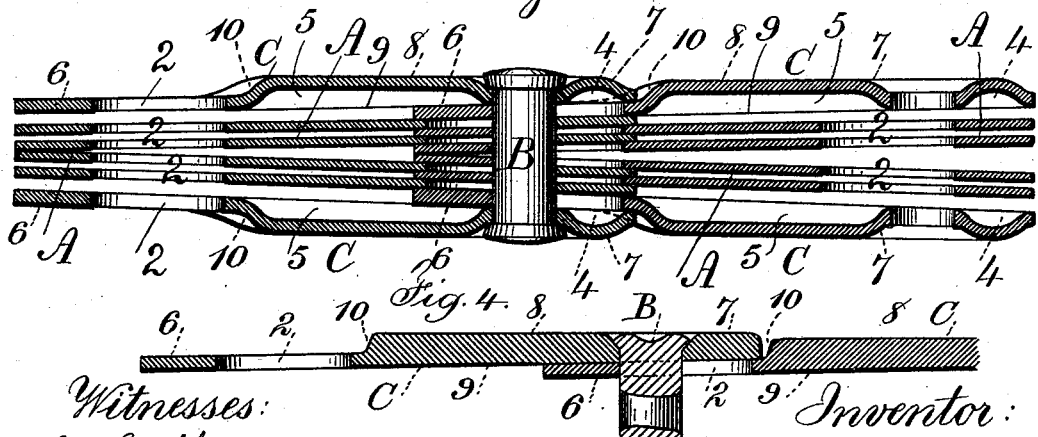
Fig. 3.
Fig. 4.
Witnesses:
J. Staib
Chas H Smith
Inventor:
C. W. Hunt
per Lemuel W. Serrell
Atty.

UNITED STATES PATENT OFFICE.

CHARLES W. HUNT, OF WEST NEW BRIGHTON, NEW YORK.

DRIVE-CHAIN.

SPECIFICATION forming part of Letters Patent No. 500,332, dated June 27, 1893.

Application filed March 20, 1893. Serial No. 466,883. (No model.)

*To all whom it may concern:*

Be it known that I, CHARLES W. HUNT, a citizen of the United States, residing at West New Brighton, in the county of Richmond and State of New York, have invented an Improvement in Traction-Chains, of which the following is a specification.

In coal handling appliances, industrial railways and other structures, endless chains have been employed composed of plate links connected together by cross bolts or rivets, and in some instances recesses have been provided adjacent to the rivets for containing lubricating material. In my present invention the plate links are peculiarly constructed and arranged in such a manner that recesses are provided for rendering the chain flexible laterally or sidewise so as not to be bound or unduly strained by a deflection of the chain from a straight course, and the chain is well adapted to passing around sprocket wheels so as to receive from such wheels the movement required to draw along buckets, cars or other devices to which such chain is connected.

In the drawings, Figure 1 is a side elevation of part of a chain with some of the links broken open. Fig. 2 is a plan view of the same. Fig. 3 is a cross section in larger size through one of the outside links, and Fig. 4 is a section of one of the outside links in a modified form.

The links A are of comparatively thin metal, preferably steel, and of suitable length, and in the end portions of such links there are holes 2. These holes are semi-circular at the outer ends and elongated as represented in Fig. 1, and they are of a size to receive through them the rivets or pivot pins B.

In order to make use of the same number of links in each transverse group of links, I prefer to place two links of one group of links between the ends of the similar links in the next group, as seen in Fig. 2. Thereby the links diverge instead of being parallel as has heretofore been usual and the chain itself is made up of any desired number of links in each group.

I have shown in the drawings four links A in each transverse group of links, but by my improvement I am enabled to make use of any desired number of plates or links in each transverse group of links, and when the chain is to be used on sprocket wheels each link may be provided with recesses 3 at one or both edges thereof for the reception of the projections or pawls upon the sprocket wheels by which such chain is caused to interlock and receive its movement from the rotation of the sprocket wheels or the pawls therewith connected.

I find it important to have the outer surfaces of the chain smooth and parallel with each other, in order that the convolutions of the chain may lay closely together upon the winding drum or that such chain may pass into a groove in the sprocket or other wheel, and with this object in view I make the outside links sufficiently thick for the riveted up or flaring ends of the pivot pins to be recessed, and the back surface of each link is at an inclination to the front surface and the end of the link which comes upon the inside of the next link is of the proper thickness to obtain the requisite strength, and the back of each link is at a slight inclination to the face of the link so as to give room for the thinner end of one link behind the thicker end of the other link.

In Fig. 4, I have represented a link as solid, and in Fig. 3 the outer links are represented as hollow for the purpose of lessening the weight of the chain. The end 6 of each outside link C is of a thickness to obtain the required strength, and the end 7 of the next link laps upon this end 6, and the surfaces 8 of the links are in line or nearly so with each other. Hence the back surfaces 9 are inclined to the front surfaces 8 of the respective links, and the ends 7 of the links are sufficiently thick to be recessed for the heads of the rivets B, so that said heads project but little or not at all from the surfaces of the respective links, and there are offsets or shoulders at 10 upon the respective links adjacent to the thicker end 7 of the next link. Hence the inner faces of the outer links are parallel with the adjacent inner links A, and the exterior surfaces 8 of the chain are parallel and there is nothing upon the exterior surfaces of the chain that is liable to become caught or injured when the chain is in use.

In Fig. 3 I have represented the links C as made of sheet metal pressed up to shape, the inner surfaces of such links being concaved or recessed, as shown at 4, 5. It will now be apparent that the elongated holes in the links allow the chain to be diverted laterally from a straight course so that such chain has a sidewise flexibility, and in consequence of the plate links in each group diverging, the outer links will assume a position at a tangent to the curve upon which the chain may be bent in its lateral or sidewise movement, and the diverging links toward the inner side of the curve will be brought into a more angular position, and for these reasons the strain upon the chain will be taken with greater uniformity on nearly all of the links, notwithstanding the fact that the plate chain does not remain in a straight line. This is a great convenience in many cases where the track or path over which the endless chain passes is more or less curved.

In addition to the aforesaid advantages the elongated holes through which the pivot pins or rivets pass retain the lubricating material, and the wear upon the pivot pins as the chain passes around the sprocket wheels is thereby lessened and the entire chain lubricated with uniformity or nearly so.

I claim as my invention—

1. The combination in a machine chain of the intermediate plate links in groups of two or more transversely and outer links having surfaces that are in line or nearly so with each other at the outsides of the chain, one end of each link coming outside and the other end inside the contiguous links, and cross rivets with their heads in countersinks or recesses, substantially as specified.

2. The combination in a machine chain of the intermediate plate links in groups of two or more transversely and outer links having surfaces that are in line or nearly so with each other at the outsides of the chain, one end of each link coming outside and the other end inside the contiguous links and rivets passing through elongated holes in the respective links and having heads in countersinks or recesses substantially as specified.

3. The combination in a machine chain of intermediate links and links C forming the outer sides of the chain, such links having surfaces 8, that are in line or nearly so with each other at the outside of the chain, and surfaces 9 that are at an inclination to the surfaces 8, countersunk or recessed holes for the heads of the pivot pins, and the ends 6 of such links passing in behind the thicker ends 7 of such links and having elongated holes, substantially as set forth.

4. The combination in a machine chain of links C forming the outer sides of the chain, such links having surfaces 8 that are in line or nearly so with each other at the outside of the chain, and surfaces 9 that are at an inclination to the surfaces 8, countersunk or recessed holes for the heads of the pivot pins, the ends 6 of such links passing in behind the thicker ends 7 of such links, and link plates A between the outer plates C, substantially as set forth.

5. The combination in a machine chain with the pivot pins of links C forming the outer sides of the chain, such links having surfaces 8 that are in line or nearly so with each other at the outside of the chain, and surfaces 9 that are at an inclination to the surfaces 8, countersunk or recessed holes for the heads of the pivot pins, the ends 6 of such links passing in behind the thicker ends 7 of such links, the inner surfaces of the links being recessed, substantially as set forth.

Signed by me this 15th day of March, 1893.

CHAS. W. HUNT.

Witnesses:
GEO. T. PINCKNEY,
WILLIAM G. MOTT.